United States Patent [19]

Voigt et al.

[11] Patent Number: 4,629,617
[45] Date of Patent: Dec. 16, 1986

[54] METHOD FOR THE PREPARATION OF HYDROGEN SULFIDE

[75] Inventors: Karl Voigt, Rodenbach; Reinhold Reck, Maintal; Friedrich Bittner, Bad Soden; Peter Kleinschmit, Hanau, all of Fed. Rep. of Germany

[73] Assignee: Degussa AG, Frankfurt, Fed. Rep. of Germany

[21] Appl. No.: 765,074

[22] Filed: Aug. 13, 1985

[30] Foreign Application Priority Data

Oct. 9, 1984 [DE] Fed. Rep. of Germany ....... 3437010

[51] Int. Cl.$^4$ .............................................. C01B 17/16
[52] U.S. Cl. ................................ 423/563; 423/561 R; 423/565
[58] Field of Search .................... 423/563, 564, 565

[56] References Cited

U.S. PATENT DOCUMENTS

| 2,214,859 | 9/1940 | Maude et al. | 423/565 |
| 2,863,725 | 12/1958 | Maude et al. | 423/565 |
| 2,876,070 | 3/1959 | Roberts | 423/563 |
| 3,961,035 | 6/1976 | Mickley | 423/563 |
| 4,146,580 | 3/1979 | Beavon | 423/563 |
| 4,235,605 | 11/1980 | Kim | 423/563 |
| 4,404,180 | 9/1983 | Drum et al. | 423/565 |

FOREIGN PATENT DOCUMENTS 539349 4/1957 Canada ............................ 423/564

Primary Examiner—John Doll
Assistant Examiner—Robert Kunemund
Attorney, Agent, or Firm—Beveridge, DeGrandi & Weilacher

[57] ABSTRACT

The method for the preparation of hydrogen sulfide from its respective elements wherein sulfur and hydrogen are reacted in a diffusion flame in a temperature range of 650° to 1300° C.

15 Claims, No Drawings

METHOD FOR THE PREPARATION OF HYDROGEN SULFIDE

The present invention relates to a method for the preparation of hydrogen sulfide from their respective elements in a diffusion flame.

It is known to produce hydrogen sulfide wherein sulfur is brought into reaction with hydrogen at a temperature of 400° to 600° C. and at pressures from 4 to 15 bar (see British Pat. No. 1,193,040). A disadvantage of this procedure in particular resides in the reduced conversion reaction velocity.

It is also known to convert and react sulfur with hydrogen at temperatures of 300° to 400° C. in the presence of a catalyst formed of cobalt- and molybdenum-compounds on aluminum oxide (see DE-AS 11 13 446). Although with this reaction process, a higher reaction velocity can be obtained, it is a very costly process because a specialized catalyst must be used which, after a determined time, must be exchanged for a fresh catalyst and which can be recycled only with difficulty.

DE-OS 28 17 937 discloses a method for the preparation of hydrogen sulfide in a flame in which in a first flame zone of a thermal reaction zone a hydrogen- and carbon monoxide containing gas is produced by partial oxidation of a hydrocarbon and in a second flame zone, the reaction product from the first zone is mixed with vaporized sulfur. Because the conversion to hydrogen sulfide only proceeds to partial completion, the mixture containing the as yet unreacted compounds is led into a catalytic conversion zone.

It is therefore the object of the present invention to provide a method for the preparation of hydrogen sulfide from its respective elements in which one proceeds without the utilization of an elevated pressure or the utilization of a catalyst and in which there is obtained a high reaction velocity and a good product yield.

A feature of the present invention resides in a method for the preparation of hydrogen sulfide from its respective elements in a flame at a temperature between 650° and 1300° C. in which the reaction mixture is subsequently quickly cooled and which is characterized in that molten or gaseous sulfur and the hydrogen are each led to the reaction chamber in a separate manner in two co-axially oriented pipes and then at the respective ends of these pipes a blending and conversion in a diffusion flame simultaneously proceeds. Preferably the reactor is a vertical reactor with the reactants, preferably in the gaseous state, are introduced at the upper end of the chamber.

The reaction blend is subsequently quickly cooled, preferably while still in the reaction chamber, to a temperature of less than 400° C. in 0.4 to 20 seconds.

The rapid cooling or quenching takes place immediately after the reaction and reduces the temperature below 400° C. to a temperature at which the unreacted sulfur is still liquid; for example, 120° C., preferably 200°. This is done so that the unreacted liquid sulfur can be quickly and easily removed from the bottom of the vertical reaction zone.

Advantageously the longer cooling time within the above range is selected for mixtures which are obtained at the upper end of the reaction temperature range indicated above.

In order to convert hydrogen and sulfur in a flame, it is necessary to utilize a temperature of at least 650° C. It is also possible to utilize temperures up to 1300° C. It is particularly suitable to use temperature in the range of 870° to 1200° C. and in particular, 1000° to 1100° C.

In carrying out the process of the present invention, there is utilized as the initial or starting materials, sulfur and hydrogen in a molecular ratio of 0.8–1.2:1.0, preferably from 0.95–0.05:1.0. It is particularly suitable to use the substances in a stoichiometric relationship.

If it is desired to reduce the hydrogen content in the obtained hydrogen sulfide gas, it is desirable to begin with an excess of the sulfur. The sulfur which is not converted is then removed in a liquid form from the bottom of a vertically oriented reactor which is used to carry out the reaction.

The sulfur is added in a liquid form or preferably in a gaseous form. To obtain the desired conversion temperature and to form the flame, it has been found to be suitable to prewarm the sulfur to a temperature of up to 600° C. It has also been found to be appropriate to preheat the hydrogen to a temperature of 1000° C. Preferably, the hydrogen is preheated to a temperature of 500° to 600° C. prior to introduction.

The quenching of the reaction gas can be carried out using an inert gas such as nitrogen, or it may be carried out using cooled reactor walls at the exit port of the reactor chamber, or there may be built in cooling surfaces arranged at the exit port which serve to quench the reaction gas. Various conventional systems for quenching a gas may be used. It is also possible to carry the reaction gas to a second chamber for quenching.

In accordance with the methods of the present invention, there is obtained a yield of more than 85% based upon the amounts of the charged sulfur. This is surprising because at the preferred reaction temperatures used in the present invention, the resulting hydrogen sulfide is, to a large extent, dissociated and according to the prior art there were previously expected only yields of about 50%.

The following examples served to illustrate the present invention.

EXAMPLE 1

Utilizing a cylindrical reaction conversion chamber of 15 cm diameter and 100 cm height, there was introduced on an hourly basis equal streams of gaseous sulfur in the amount of 0.32 kg (10 mols) and 0.23 normal liters (10.3 mol) hydrogen. The charging of the reactants was carried out from above the chamber through two co-axially oriented pipes wherein the innermost pipe charged the sulfur and the outermost pipe served to charge the hydrogen. The sulfur was prewarmed to 450° C. and the temperature of the hydrogen was 25° C. Blending and conversion followed at the end of the charging pipes in a diffusion flame at 875° C. In the lower portion of the conversion chamber, the reaction mixture was cooled to a temperature below 400° C.; i.e. 200° C. There was obtained 85% conversion of the charged sulfur into hydrogen sulfide.

EXAMPLE 2

Following the procedure described in Example 1, there was charged to the reaction vessel 1.03 mol hydrogen per mol of sulfur. The hydrogen was previously warmed to a temperature of 600° C. The temperature of the flame was 1000° C. There was obtained in the conversion 95% of the charge sulfur to hydrogen sulfide.

EXAMPLE 3

Following the procedure set forth in Example 1, sulfur and hydrogen were charged in a stoichiometric ratio. The hydrogen was preheated to a temperature of 600° C. The temperature of the flame was 1025° C. As a result of this reaction, 98% of the charged sulfur was converted into hydrogen sulfide.

Further variations and modifications of the above described invention will become apparent to those skilled in the art from a reading of the foregoing and are intended to be encompassed by the claims appended hereto.

The entire disclosure of the German application P 34 37 010.2 filed Oct. 9, 1984 is relied on and incorporated herein by reference.

We claim:

1. A method for the preparation of hydrogen sulfide from its respective elements consisting essentially of separately charging sulfur and hydrogen through two coaxially oriented pipes to a reaction zone wherein the sulfur is charged to the reaction zone through inner pipe means and the hydrogen is charged to the reaction zone through outer pipe means and conducting a flame reaction at a temperature in the range of 650° to 1300° C. by simultaneously blending and converting the hydrogen and sulfur in a diffusion flame at the point of introduction of said sulfur and hydrogen into the reaction zone, in the absence of a catalyst, to thereby form a reaction product consisting essentially of $H_2S$, and subsequently quickly cooling the reaction mixture.

2. The method according to claim 1, wherein the reaction mixture is cooled within a time period of 0.4 to 20 seconds to a temperature below 400° C.

3. The method of claim 1, wherein the temperature of the reaction takes place in the range of 870° to 1200° C.

4. The method according to claim 3, wherein the reaction takes place at a temperature in the range of 1000° to 1100° C.

5. The method according to claim 1, wherein the sulfur and the hydrogen are in molar ratio of 0.8–1.2:1.0.

6. The method according to claim 5, wherein the molar ratio of sulfur and hydrogen is in the range of 0.95–1.05:1.0.

7. The method according to claim 1, wherein the sulfur is utilized in excess of the stoichiometric amount.

8. The method of claim 1, wherein unreacted sulfur is removed in the liquid form from the lower end of said reaction zone.

9. The method of claim 1, wherein the sulfur is preheated to a temperature of up to 600° C.

10. The method of claim 1, wherein the hydrogen is preheated up to a temperature of 1000° C.

11. The method according to claim 1, which is carried out at atmospheric pressure.

12. The method of claim 1, wherein the reaction zone is a vertical reaction zone and the sulfur and hydrogen are introduced from above and any excess reactants are removed from below.

13. The method of claim 1, wherein the reaction mixture is cooled to a temperature at which the sulfur is liquid.

14. The method of claim 13, wherein the temperature is about 120° C.

15. The method of claim 13, wherein the temperature is about 200° C.

* * * * *